(12) United States Patent
Nikain et al.

(10) Patent No.: US 11,606,259 B1
(45) Date of Patent: Mar. 14, 2023

(54) LOW DELAY NETWORKS FOR INTERACTIVE APPLICATIONS INCLUDING GAMING

(71) Applicant: AT&T Intellectual Property I, L.P., Atlanta, GA (US)

(72) Inventors: Mohammad Nikain, Atlanta, GA (US); Daniel Connolly, Suwanee, GA (US); Thomas Brooks Fitzsimmons, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/698,072

(22) Filed: Mar. 18, 2022

(51) Int. Cl.
*H04J 3/06* (2006.01)
*H04L 41/12* (2022.01)
*A63F 13/358* (2014.01)
*H04L 41/0803* (2022.01)
*H04L 67/12* (2022.01)

(52) U.S. Cl.
CPC ............ *H04L 41/12* (2013.01); *A63F 13/358* (2014.09); *H04L 41/0803* (2013.01); *H04L 67/12* (2013.01)

(58) Field of Classification Search
CPC ..... H04L 41/12; H04L 41/0803; H04L 67/12; A63F 13/358
See application file for complete search history.

(56) References Cited

U.S. PATENT DOCUMENTS

| | | | |
|---|---|---|---|
| 11,165,627 B2 | 11/2021 | Nikain et al. | |
| 11,206,095 B1* | 12/2021 | Wang | H04W 56/001 |
| 2001/0003191 A1* | 6/2001 | Kovacs | H04L 67/04 |
| | | | 719/310 |
| 2022/0027192 A1 | 1/2022 | Nikain et al. | |

\* cited by examiner

*Primary Examiner* — Kim T Nguyen
(74) *Attorney, Agent, or Firm* — Guntin & Gust, PLC; John G. Rauch

(57) ABSTRACT

Aspects of the subject disclosure may include, for example, determining delay data for respective network delays through a communication network from respective gaming stations to a gaming provider database for implementing a multi-user online video game, determining available cloud nodes in a potential path in the communication network between a respective gaming station and the gaming provider database, determining potential network configurations for data communication between the respective gaming stations and the gaming provider database using the available cloud nodes and available communication links, identifying an optimum configuration for data communication between the respective gaming stations and the gaming provider database, wherein the optimum configuration provides a minimum fair delay for the respective gaming stations, and configuring the communication network according to the optimum configuration. Other embodiments are disclosed.

20 Claims, 10 Drawing Sheets

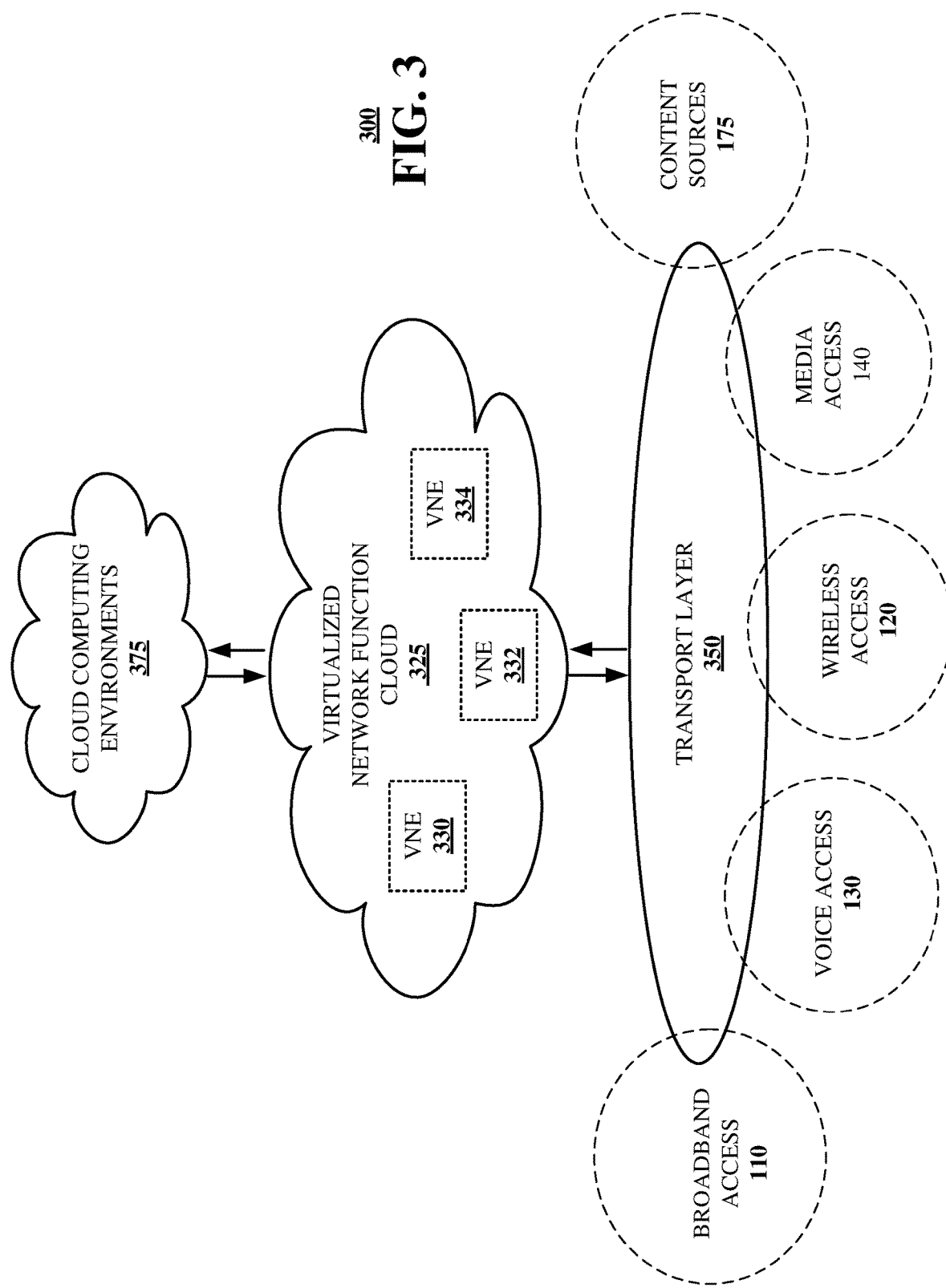

LOW DELAY NETWORKS FOR INTERACTIVE APPLICATIONS INCLUDING GAMING

FIELD OF THE DISCLOSURE

The subject disclosure relates to development and operation of low-delay communication networks for interactive applications such as gaming.

BACKGROUND

Applications can provide interaction among participants on a communication network. The interaction should be fair, that is, have equal latency for all participants. Conventionally, networks having higher bandwidth and faster data rates have been used to provide fairness.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
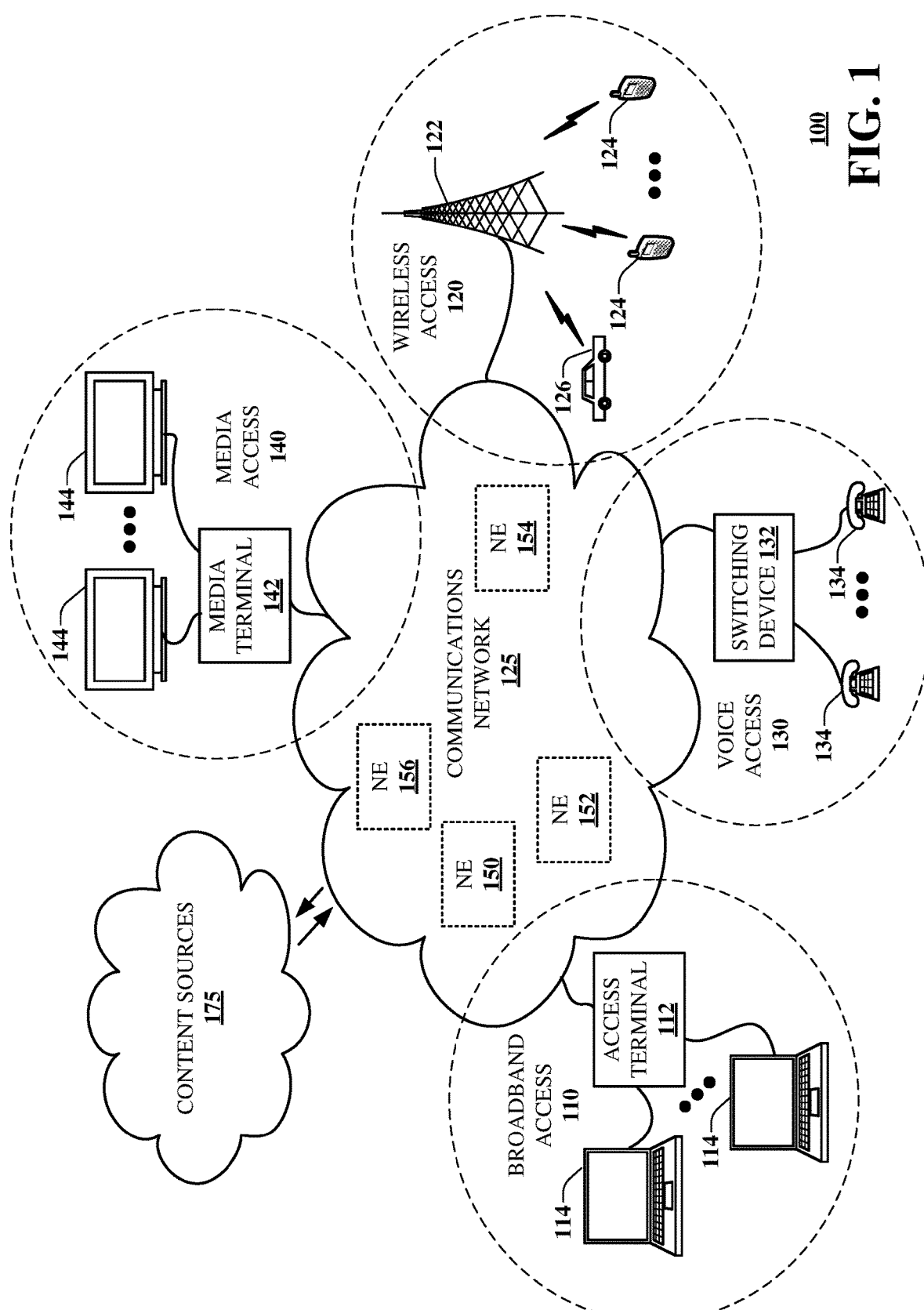
FIG. 1 is a block diagram illustrating an exemplary, non-limiting embodiment of a communications network in accordance with various aspects described herein.

The subject disclosure describes, among other things, illustrative embodiments for optimizing or improving location of functions for an online video game or other application. Such online games are interactive and strive to provide a near-artificial reality experience for gamers who participate in the game. Delay has become a major blocker in the advance of this industry. These games rely on a number of interacting miscroservices, including some at player's home or site, and some at video game provider, such as Microsoft Corp. or Sony Corp. By optimizing the location of these microservices, the overall delay of the game can be significantly reduced, enhancing the user experience and also enabling more advanced games to be produced. Systems and methods are disclosed which use the edge cloud, or cloud nodes in network provider central offices, and user's computers as the compute platform for these microservices. The microservices are distributed based on a set of criteria in order to minimize or reduce delay experienced by users. Other embodiments are described in the subject disclosure.

One or more aspects of the subject disclosure include receiving, from client software agents located at respective end user gaming stations, information about available capacity of the respective end user gaming stations, receiving, from server software agents located at respective cloud nodes of a communication network, information about availability of the respective cloud nodes, and receiving, from the client software agents, information about communication link characteristics including delay times through the communication network. Aspects of the subject disclosure further include forming a graph of network nodes and communication links in the communication network, the graph specifying a respective available capacity for each respective network node and a respective delay for each respective communication link, for a set of network configurations, determining a potential delay for each possible permutation of network configurations, forming a set of potential delays, selecting a selected configuration based on the set of potential delays, and reconfiguring the communication network according to the selected configuration.

One or more aspects of the subject disclosure include determining delay data for respective network delays through a communication network from respective gaming stations to a gaming provider database for implementing a multi-user online video game, determining available cloud nodes in a potential path in the communication network between a respective gaming station and the gaming provider database, the available cloud nodes capable of running microservices for the multi-user online video game, determining potential network configurations for data communication between the respective gaming stations and the gaming provider database using the available cloud nodes and available communication links, based on the delay data for respective network delays, identifying a selected configuration for data communication between the respective gaming stations and the gaming provider database, wherein the selected configuration is selected as a network configuration that provides a minimum fair delay for the respective gaming stations, and configuring the communication network according to the selected configuration.

One or more aspects of the subject disclosure include receiving measured delay information corresponding to delay times measured by user device software agents instantiated at user gaming devices of a communication network, the delay times representing data communication delays from the user gaming devices to a network gaming data center which is operative to provide an interactive gaming application to the user gaming devices; receiving available capacity information, the available capacity information corresponding to available processing capacity determined by server software agents instantiated at edge cloud nodes of the communication network. Aspects of the subject disclosure further include selecting an optimum configuration for providing the interactive gaming application to the user gaming devices by the network gaming data center, wherein the selecting is based on the measured delay information and the available capacity information and wherein the optimum configuration is selected as a network configuration of the communication network that provides equal delays and minimum delays for each respective user gaming device of the user gaming devices participating in the interactive gaming application, and configuring the communication network according to the optimum configuration.

Referring now to FIG. 1, a block diagram is shown illustrating an example, non-limiting embodiment of a system 100 in accordance with various aspects described herein. For example, system 100 can facilitate in whole or in part collecting network delay information from end user gaming devices and available capacity information and selecting an optimum configuration for placement of microservices, the optimum configuration being a network configuration which minimizes network delay for all end user gaming devices. In particular, a communication network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communication network 125 includes a plurality of network elements (NE) 150, 152, 154, 156, etc. for facilitating the broadband access 110, wireless access 120, voice access 130, media access 140 and/or the distribution of content from content sources 175. The communication network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communication network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
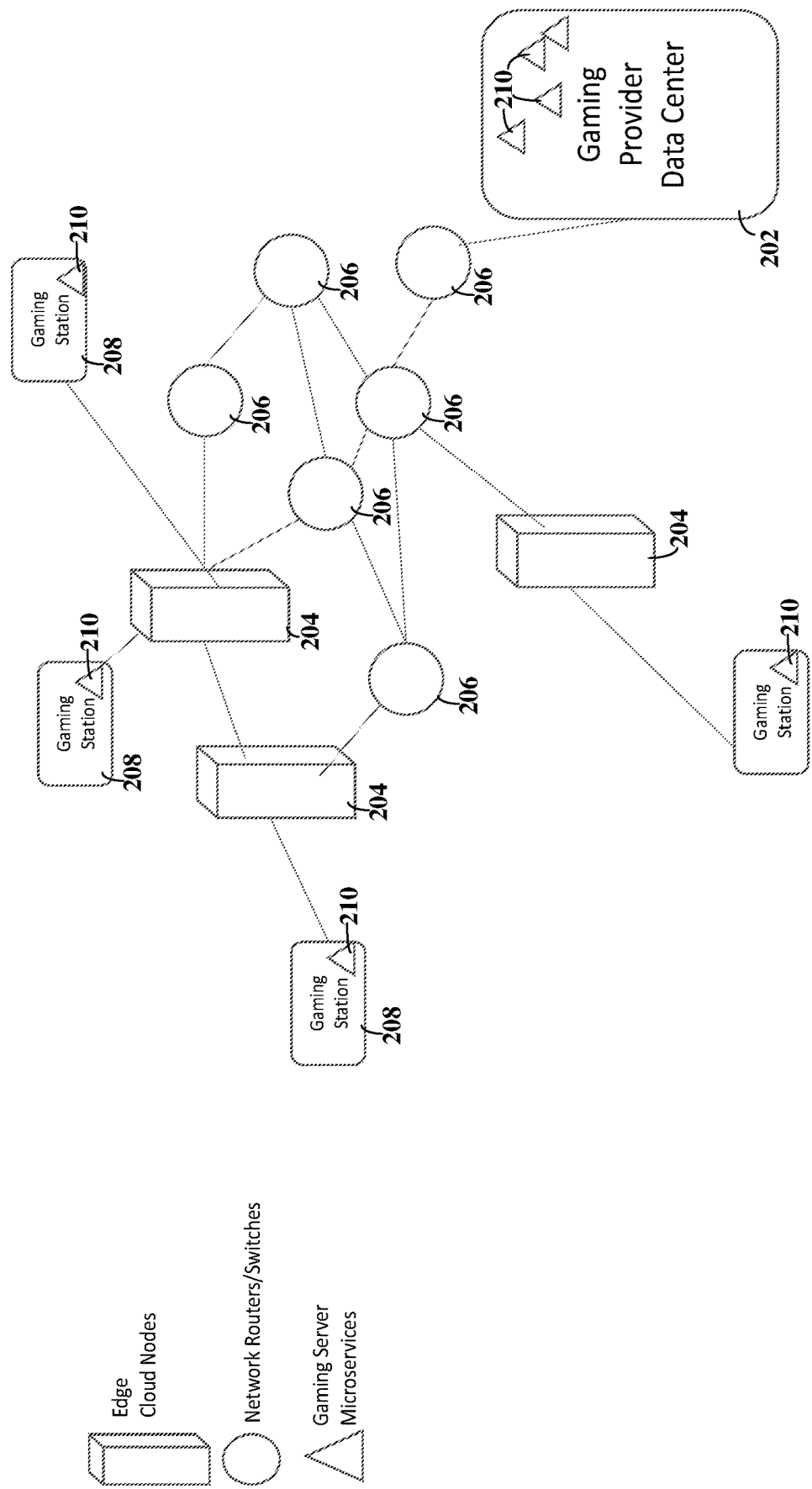
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network 125 of FIG. 1 in accordance with various aspects described herein. The system 200 includes in this example a gaming provider data center 202, a plurality of edge cloud nodes 204, and a plurality of network routers or network switches, generally referred to as network routers 206. The gaming provider data center 202 implements and controls an interactive application that may be participated in by a plurality of participants. Each participant in this example uses a gaming station 208 to participate in the application. Examples of a gaming station 208 include an Xbox® gaming console available from Microsoft Corp. or a PlayStation®5 available from Sony Corp. In other examples, other types of application other than or in addition to a gaming application may be implemented in the system 200. For example, any sort of communication operation, such as video networking or other data exchange, including applications that are interactive among multiple participants or by participants interacting with a centralized or distributed system such as the gaming provider data center 202, may benefit from the techniques and technology described herein in conjunction with a gaming application.

In an exemplary embodiment, participants at gaming stations 208 participate in the application. The gaming stations may include any suitable hardware, software, or combination for providing a gaming experience for the participant. In general, each gaming station may include one or more processing systems including a processor and a memory storing data and instructions for controlling the processor. Further, each gaming station may include a user interface enabling the participant to interact with a gaming application. The user interface may include a keyboard, gaming controllers including buttons, joysticks and other devices, one or more visual displays and one or more audio processing devices such as speakers, headphones and microphones. In some applications, one or more gaming stations 208 may enable augmented reality, virtual reality or extended reality or similar (generally, XR) interaction by the participant. XR interaction may enable interactive, real-time participation in a gaming application with other participants at other gaming stations or with the gaming application, such as at the gaming application data center. Real-time participation generally means providing inputs to the gaming station 208 and receiving a response with essentially no delay perceptible to the human participants. One goal for some gaming applications and other applications that communicate data is to provide a near-Artificial Reality (AR) experience for users.

Data associated with the game play, or other applications, is conveyed over the network routers 206 and the edge cloud nodes 204. The network routers 206 communicate data using a communication protocol such as transmission control protocol/Internet protocol (TCP/IP). Data is packetized and routed using information contained in the packets. The edge cloud nodes 204 represent a point of presence for the network near users such as the participants interacting with the gaming stations 208. The edge cloud nodes 204 offer to the gaming stations 208 access to compute and storage resources of the network, at the edge of the network. Network functions or virtual network functions (VNF) may operate to distribute functions that collectively comprise applications at the edge locations of the network. The edge cloud nodes 204 are not merely routers, such as network routers 206. In addition, software applications such as a gaming application can run on the edge cloud nodes 204. In this manner, latency may be reduced for the benefit of participants using the gaming stations 208. The edge cloud nodes 204 provide network services at physical locations relatively close to end user such as the gaming stations 208.

In accordance with some embodiments, gaming server microservices 210 may be instantiated at the gaming provider data center 202 as well as at some or all of the gaming stations 208. Communication service providers (CSPs) are transitioning to operations support systems (OSS) architectures based on microservices. Microservices are an architectural and organizational approach to software development where software is composed of small independent services, deployed in a host (physical or virtual machine), that communicate over well-defined application programming interfaces (APIs). In general, each microservices is autonomous. Each component service in a microservices architecture can be developed, deployed, operated, and scaled without affecting the functioning of other microservices. Services do not need to share any of their code or implementation with other services. Any communication between individual components happens via well-defined APIs. Microservices may be specialized. In examples, each service is designed for a set of capabilities and focuses on solving a specific problem. As a microservice becomes complex, it can be broken into smaller services. Portions of the microservice can be distributed around the network.

The video gaming industry makes extensive use of network communications. The video gaming industry exceeded $20 billion in 2020. Some video games strive to provide a near-Artificial Reality experience for participants. In such games, network delay has become a major blocker in the advance of this industry. Such video games rely on a number of interacting microservices. As illustrated in FIG. 2A, some microservices may be located at a player's gaming station, and some microservices may be located at video game provider. By optimizing the location of these microservices, the overall delay of the game can be significantly reduced, enhancing the user experience and also enabling more advanced games to be produced. Given the size of the industry and its aggressive growth rate, demand for such a low delay strategy will be significant over the next 5-10 years and beyond.

Popular online video games may involve tens, hundreds, or even thousands of users playing a very complex game in which user experience is approaching artificial reality. While the majority of video games do not offer a fully immersive Artificial Reality (AR) experience, such games do try to approach AR in terms of providing an immersive experience for users. Many online video games are fast moving and require quick reflexes. Examples include war or shooting games, or playing a sport such as soccer, etc. Communications delay is a major and notorious issue faced by these games and is a subject that the gamers and gaming providers try to address. Faster machines and higher speed connections have helped to some extent but cannot keep up with the demand for lower delays due to the increasing sophistication of the games. While video games are presented here as an example, other applications such as video conferencing experience similar issues with unacceptable network delay.

Further, network providers are currently rolling out Network as a Service (NaaS) capabilities for customers. The network providers establish ad hoc network capabilities to meet very specific performance characteristics required by customers. In this usage, the term ad hoc generally means created or used for a particular purpose, as necessary. One example of a network performance characteristic relates to network latency. Latency refers to delay of communication of data over a network, including for example, the time required to capture a packet of data, transmit the packet through perhaps multiple devices, receiving the packet at the destination and then decoding the packet. In the example, in an ad hoc network created by a network operator, network latency is both substantially minimized and substantially equalized for all participants in the network. The network provider may, through software, instantiate a network service to establish a temporary, ad hoc network of devices configured to satisfy a customer's performance requirements. The ad hoc network, and the network service, may operate for a designated period of time and then be torn down via software. Components of the ad hoc network may be shared during the lifetime of the network. Similarly, components of the ad hoc network may be reused following the tear down of the network.

In an example, performance characteristics are software driven to define the ad hoc network. The network operator creates a private, high availability, low latency, low jitter, low packet loss ad hoc network for use by a designated group of users. The ad hoc network may be highly secure against intrusion as a private network with high security standards. The network may be ephemerally stood up for a period of time for a particular purpose, such as gaming among the participants. When the game or other purpose is over, the network can be torn down by the network operator.

The network operator can arrange the components to manage network latency for all participants. For example, a ping time from a game console of a particular user to the network device where the game is being played or to another player may be established with reliability and always less than a threshold such as 20 msec. The network operator may, for example, set thresholds and priorities for packets through the network and other public or private networks such as the internet to equalize and minimize packet latency.

Gaming is one suitable application for such a software instantiated network. Other examples may benefit from the ability to specify network parameters and, through software, establish an ad hoc network satisfying the specified requirements. For example, a corporation may wish to establish a network for shareholder communications and one set of participants are to be designated for high-reliability, low latency, highly private and secure communications. These participants may warrant this treatment as important investors or corporate officers.

The ad hoc network may also be termed a dedicated soft network, a slice, or by other terms. The components of the network are generally available to communicate with other users. However, the subset of components of the network, and the designated users of the ad hoc network, are given special treatment by the network. In the example, the subset network gets more resources regarding delay or latency, such as for playing a game. The network components and operation are established so that all game players experience substantially identical delays or latency. For example, in a video game, even 100 msec of additional delay for a user relative to other users can cause a substantial change in experience for the user experiencing the delay. The game outcome may be substantially changed.

Conventionally, a user requiring lower latency will obtain or be assigned a higher bandwidth connection. Such a connection may operate to minimize delay for users. Therefore, the chances for delay are less. However, new applications, including new games, are being developed that increase the importance for equalizing delay among participants. For example, current games are approaching Augmented Reality (AR) capabilities in which a user experiences a mix or physical attributes and virtual attributes through an AR headset or other device. Such games require very high bandwidth communication and low latency. In addition, such game can be very interactive, with two or more users interacting through the game or one or more user interacting with the game. Such interaction requires that the latency be both minimal and equal, so that each player has a similar experience. New applications require higher performance than is available simply though a faster connection.

In the example of FIG. 2A, a gaming application is segmented into microservices 210. The microservices 210 that operate on the gaming provider data center 202 cooperate with the microservices 210 that operate on the users' gaming stations 208. Thus, a portion of the game occurs on the gaming stations 208 and a portion of the game occurs on the gaming provider data center 202, such as a datacenter maintained by a gaming provider such as Microsoft Corp.

Generally, the gamers operating the gaming stations 208 experience different delays or latency. Each gaming station 208 communicates with the gaming provider data center 202 through a different portion of the network and communicates with other gaming stations 208 through different portions of the network. The different portions of the network may be affected differently. One portion of the network may have higher congestion due to network traffic than another network portions. One route through the network may have more router hops than another route through the network.

Figure 2B:
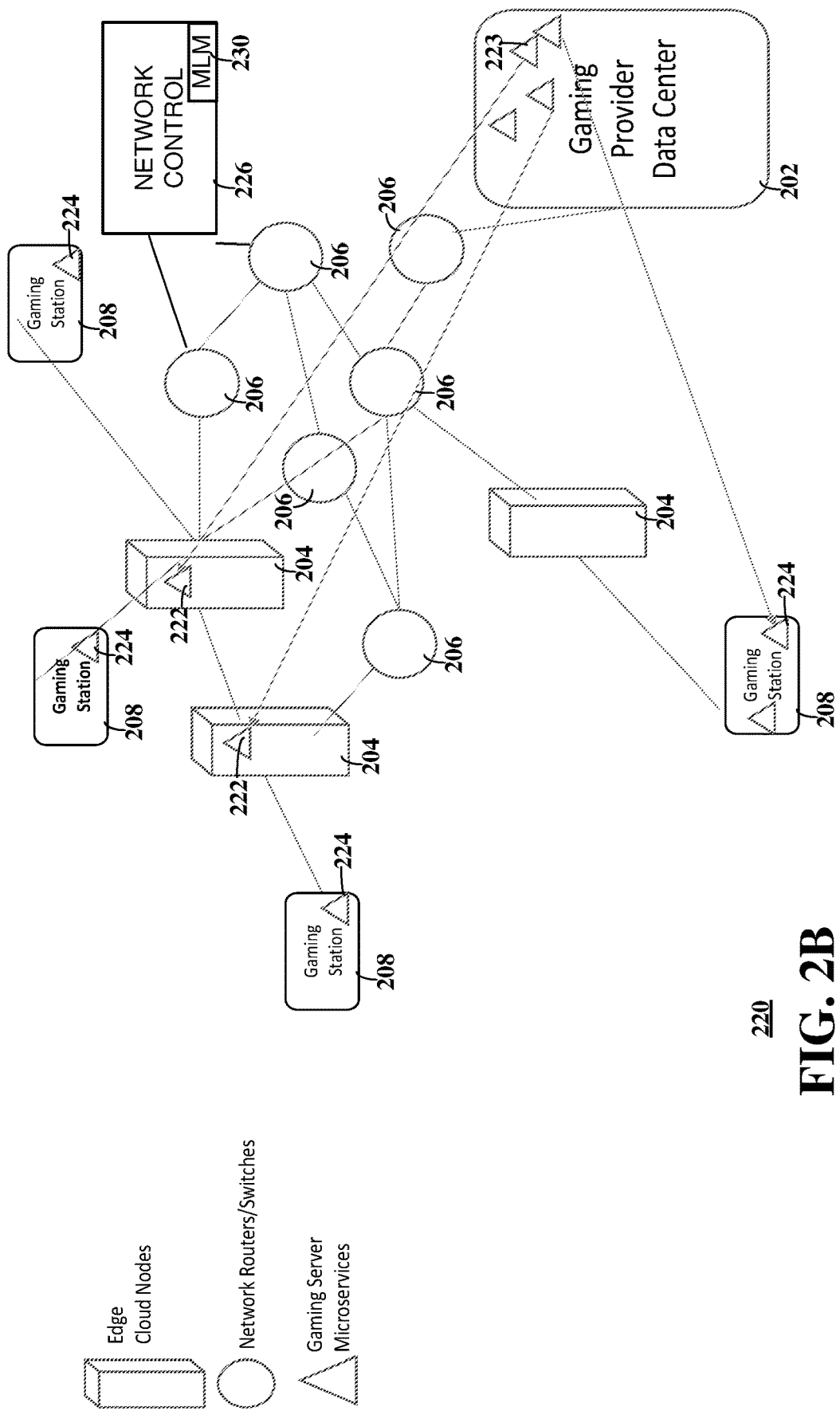
FIG. 2B is a block diagram illustrating an example, non-limiting embodiment of the system of FIG. 2A functioning within the communication network of FIG. 1 in accordance with various aspects described herein.

FIG. 2B is a block diagram illustrating an example, non-limiting embodiment of a system 220 functioning within the communication network 125 of FIG. 1 in accordance with various aspects described herein. In the example of FIG. 2B, one or more server microservice modules 222 have been instantiated at particular edge cloud nodes 204 of the network. Some of the microservices 210 maintained at the gaming provider data center 202 in system 200 of FIG. 2A have been moved or replaced by server microservice modules 222 at the edge cloud nodes 204 of system 220 of FIG. 2B. A network controller 226 provides control functions for the network including the network routers 206 and the edge cloud nodes 204.

In the example of FIG. 2B, the server microservice modules 222 have been moved closer to the gaming stations 208 relative to the example of FIG. 2A and have been strategically positioned so that every gaming station 208 experiences a minimal delay through the network and substantially the same level of delay through the network. In examples, an optimum solution may be found based on the type of game, end-user activity, and requirements for the particular game and session. [JGR1] The solution is based on minimum "fair" delay, that is, the solution reduces the delay to the minimum available but also maintains similar delay or disadvantage for each user at each gaming station 208.

Further, every gaming station 208 is equipped with a client microservices module 224. The client microservices module 224 cooperates with the server microservices module 222 of one or more edge cloud nodes 204 to provide a gaming function or set of functions to the gaming station 208. In an example, the client microservices module 224 is installed or instantiated on the gaming station 208 by the manufacturer or retailer of the gaming station 208. The manufacturer of the retailer may be different from and independent from the network operator that provides the system 220. Under a license or agreement or other terms, the manufacturer or retailer of the gaming station is authorized by the network operator to install the client microservices module 224 on a gaming station 208. In an example, when the gaming station 208 is installed and activated by a purchaser, software of the gaming station 208 prompts the user to install and activate computer code including the client microservices module 224 on the gaming station. The client microservices module 224 may be downloaded, with other software, updates and other information for the gaming station 208. The retailer, manufacturer or other party may pay a licensing fee to the network operator, for example, for every copy of the client microservices module 224 that is downloaded and installed. The client microservices module 224 allows the manufacturer, the gaming provider associated with the gaming provider data center 202, etc., to provide a better level of service to gaming clients or customers.

In the example, instead of every gaming station 208 having to communicate with the gaming provider data center 202 for gaming interaction, each gaming station can interact with a server microservice modules 222 positioned at an edge cloud node 204 which is located physically closer to the gaming station 208 and, importantly, at a near-minimal delay from the gaming station 208. Network operation can be optimized for delay for all participants at all gaming station. Further, network traffic can be switched through the network including the network routers 206 and the edge cloud nodes 204. In this manner, some higher priority can be given to paths through the network from the gaming provider data center 202 to a gaming station that may be more subject to delay such as due to network congestions. The higher priority may make such paths in the network more delay-tolerant or less prone to delay.

In the example embodiment, when operation of the gaming application (or any other suitable application begins), the client microservices module 224 on the gaming stations 208 communicate with the server microservices modules 222. The client microservices module 224 form a software agent located at client devices such as the gaming stations 208 for measuring delays in the network. The client microservices module 224 begin measuring delay and reporting the measured delay to the server microservices modules 222. Any suitable delay measurement may be used. In an example, a game may be simulated, and simulated game TCP packets may be exchanged to measure the existing delay.

In some examples, the type of measurement or degree of measurement may be configurable, for example based on preferences of the gaming provider associated with the gaming provider data center 202. In one example, the gaming provider may select to use full application layer packets with full handshaking by the transmitting server and the receiving server. In another example, the gaming provider may select to use Internet Control Message Protocol (ICMP) ping functions or User Datagram Protocol (UDP) ping functions. A ping is a command that reaches out and asks an intended recipient if the recipient is there and waits for a response. The intention of a ping is to make sure the recipient is present and functioning and to measure the amount of time required to get a response. Further, the gaming provider may select to measure delays just between gaming stations 208 and servers such as edge cloud nodes 204 or to also or instead measure delays between respective edge cloud nodes 204 or respective gaming stations 208. The gaming provider may select more complete or elaborate delay measurement depending on factors of interest to the gaming provider, such as the relative speed or immersiveness of the game, the retail cost of the game, or other factors.

Further, the server micro services modules 222 of the edge cloud nodes 204 share the measured delays with other edge cloud nodes and with the network controller 226. The network controller 226 in some embodiments includes a processing system including a processor and a memory that stores executable instructions that, when executed by the processing system, facilitate performance of operations. The operations include communicating with the server microservices modules 222 of the edge cloud nodes 204 and the client microservices modules 224 of the gaming stations 208. The network controller 226 has knowledge of the configuration of the network and real time information about current traffic on the network, such as network locations that are congested, network locations such as network routers that are not currently functional, etc. Based on the reported delay measurements and knowledge about the network configuration and current conditions, the network controller 226 can try different configurations to minimize and equalize the delay for each gaming station. The game is underway, but the network controller 226 can adjust delays experienced by individual gaming stations 208 without impacting the game. That process can result in a network condition that has better delay characteristics than was the case initially.

Delays for individual participants or gaming stations can be measured and made minimum and equal. Delays are reduced and equalized. Delay can never be eliminated; network components will necessarily have some nominal delay. However, the delay should be reduced so that all gaming stations experience approximately the same delay, within a tolerance. For example, in a game with four players, every gaming station has 100 msec delay. It may be possible to reduce a first player to experience 0 delay but the second player through the fourth player will experience 50 msec delay. That would not be considered fair, since the first player would have an advantage by having a lesser delay. Therefore, in this example, a better solution for delay characteristics would have all player experience 75 msec delay, plus or minus 5 msec tolerance. The tolerance value may be selected by the gaming provider based on characteristics of the game and other factors.

In another example, some participants in an application may be prioritized to have less delay than others. For example, in a corporate conference call, some critical investors or corporate officers may be prioritized by being assigned a reduced network delay or improved video quality, for example. This could be in recognition of their status or to provide them with higher capabilities of privileges. Some delays for some participants may be given more weight or priority. Alternatively, delay values may be established in tiers and participants may be assigned to respective tiers based on any suitable factors. The tiers and other aspects may be selectable by selecting options at network controller 226 or by any other suitable means.

After different test scenarios are examined and a best option or network configuration is identified, then the network controller 226 communicates with the gaming provider data center 202. The communication may define a new network configuration that will provide better delay characteristics for the game. The new network configuration may involve selecting particular edge cloud nodes 204 for instantiating server micro service modules 222.

Thus, a game or other application running on a set of current servers, edge cloud nodes 204, is moved to a set of new servers, edge cloud nodes 204. The new servers may include one or more of the current servers, but the new servers are selected to provide better delay characteristics for the game. In the example, better delay characteristics include minimal delay experienced by all gaming stations 208 and equal delay experienced by all gaming stations 208.

Under the control of the gaming provider data center 202, the network controller 226 or both, a new server at a new network location is synchronized with a current server that is currently running the game. This server synchronization is done for all servers or edge cloud nodes participating in the game and hosting a server microservice module 222. Synchronization includes sharing of all current game state information and, if necessary, historical game state information. After synchronization, a switch is made from current servers to new servers, with no apparent disruption to the game for the gamers. Some current servers will be replaced by new servers, including those current servers that have particularly bad delay characteristics. Some current servers may not move to a new server or network location.

The process of measuring delays and trying different configurations to find an optimal solution may take a few seconds, a few minutes or longer. It may be desirable to identify trends and variations in network operation and to therefore let the game or other application proceed and collect performance information. Those trends and variations may be factored into the selection of an optimum solution. The optimum solution may change over time as factors change. Some factors may include gamers or other participants entering or leaving the game at their gaming stations 208, network changes including variable network traffic and changing network configuration. Therefore, the optimum solution may be updated on a periodic or as-needed basis. In one example, the optimum solution may be determined periodically, such as every 15 minutes. In another example, a set of changes may be defined that will prompt reevaluation of an optimum solution, such as a gamer entering or leaving the game, or a certain number, such as 5 gamers, entering or leaving the game. Further, the reevaluation prompt may be based on performance factors. For example, the gaming stations 201 or edge cloud nodes 204 may take continuous delay measurements. Reevaluation of the optimum solution may be triggered if the delay measurements vary by a selected amount, such as 10 percent or 50 msec. The factors used to control reevaluation of the optimum solution may be set optionally by the network operator or the gaming provider, for example.

In some embodiments, an artificial intelligence (AI) module or machine learning module (MLM) 230 may operate to collect delay measurements and determine the optimum solution for the current application, participants and network configuration. Moreover, the MLM 230 may collect historical data about when the network has been reconfigured to reduce and equalize delays for gamers. The historical data may show groups of conditions or circumstances, or patterns of groups or circumstances, in operation of the game or the network that correspond to prior reconfiguration of the network. The historical data about the network, the delay measurements and other information may serve as training data for the MLM 230. Further, the MLM 230 may have a confidence factor or level of certainty about the accuracy of a prediction, such as a prediction that a switch to a new network configuration should be made. When the confidence factor exceeds a threshold, the MLM 230 may trigger a reconfiguration of the network to a configuration that better reduces delays to fair delays for all participants. In this manner, the MLM 230 can select an optimum configuration based on its predictions and confidence factor immediately as the game is initiated, without the need to take delay measurements.

In embodiments, the gaming server microservices 223 and gaming station microservices modules 224, in conjunction with the gaming provider data center 202 and the network controller 226, implement an internet-based ad hoc control bearer path negotiation process. The gaming server microservices 223 and gaming station microservices modules 224 and the network controller 226 operate as an ad hoc control plane running adjacent to the bearer plane formed by the gaming stations 208 and the gaming provider data center 202. The gaming server microservices 223 and gaming station microservices modules 224 and the network controller 226 collect and process delay data and other information and, in a software process, orchestrate the most optimized bearer path through software enablement of network components. The control plane provides or enables communication between mobile edge compute elements like the edge cloud nodes 204 and user premises elements like the gaming stations 208 to orchestrate how the bearer path will actually operate. That control plane communication is separate from but adjacent to the actual bearer plane communication.

Figure 2C:
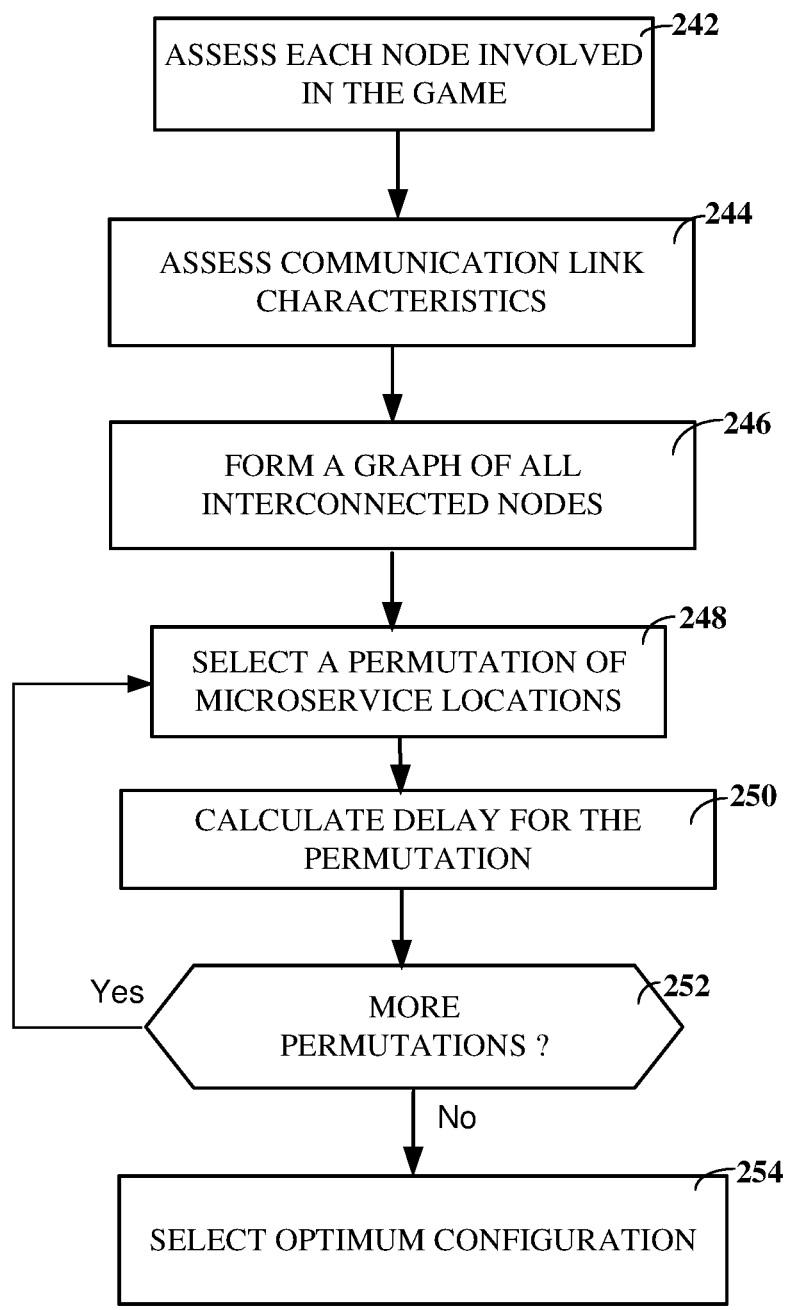
FIGS. 2C, 2D and 2E depict an illustrative embodiment of a method in accordance with various aspects described herein.
Figure 2D:
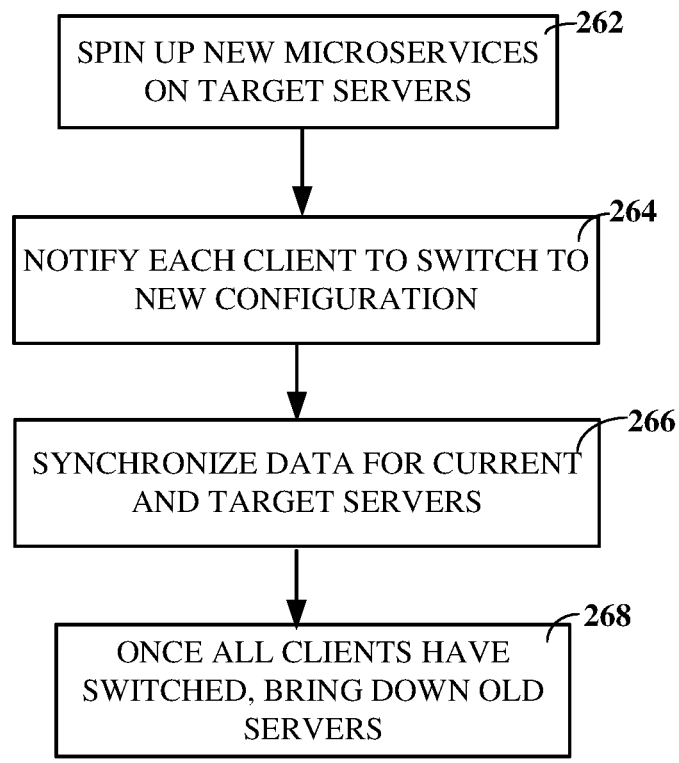
Figure 2E:
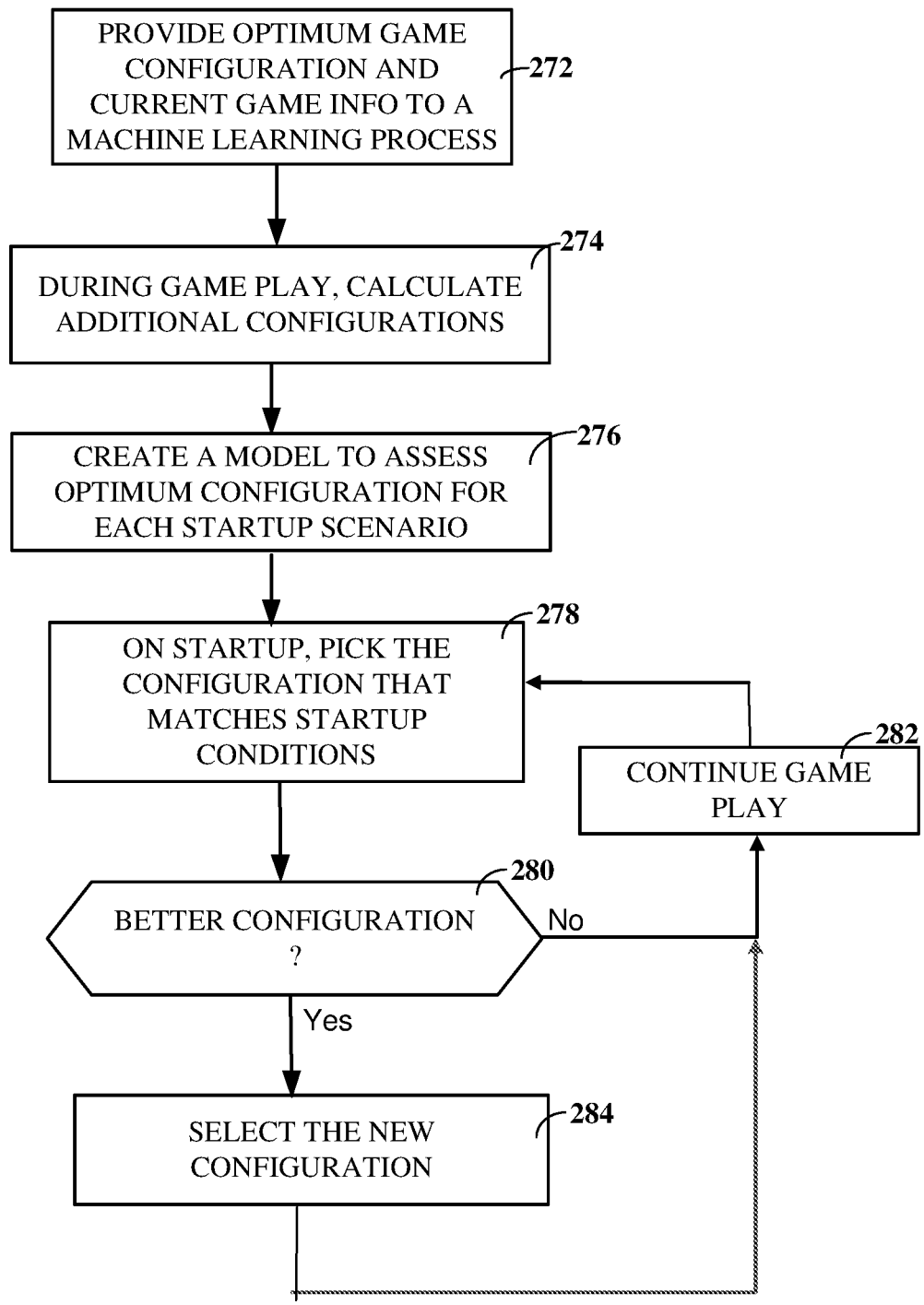

FIGS. 2C, 2D and 2E depict an illustrative embodiment of a method in accordance with various aspects described herein. FIG. 2C illustrates an embodiment of method 240 for optimizing location of microservices in a network such as system 200 of FIG. 2A and system 220 of FIG. 2B. The steps of method 240 may be performed at any suitable location or combination of locations, including for example, a central control node such as network controller 226 of FIG. 2B, or by distributed processing among a collection of network locations such as some or all of the edge cloud nodes 204.

The microservices in one embodiment of part of the functionality of an online video game or other interactive application. The games or other application includes a set of interacting microservices. Some microservices exist on the user's computer, such as at the user's home or a player location. Some microservices are located on servers of the gaming provider, such as Microsoft Corp. The participants in the game or other application experience delay caused by the interaction of these microservices and the distance, in terms of server hops, etc. and not physical distance, various packets have to traverse to handle the complex underlying communication. For example, the microservices operate to keep all participants' view of the game world or environment identical. The network may include edge cloud nodes, such as cloud nodes in the central offices of the network provider and user's computers as the compute platform for these microservices. The microservices may be distributed based on a set of criteria in order to minimize delay.

Method 240 illustrates a first phase of the procedure for optimizing location of microservices in a network. Method 240 may be performed while the game is underway including having game participants interacting with other participants or with the game as presented at the gaming provider data center. During performance of method 240, some participants may experience longer delays than other participants and may find the delays unfair or objectionable. Method 240 operates to correct this problem.

At step 242, the method 240 includes an operation of assessing each node involved in the game. The nodes include servers of the network that host one or more microservices that form a part of the game. The nodes also include participants' computers, such as gaming stations that enable the participants to interact with the game and with other participants. Assessment of each node includes determining spare capacity, if any, at the participants' computers or gaming stations. Capacity may be determined in any suitable manner, such as available processing capacity, available memory capacity and available communication capacity measured in, for example, Mbps of throughput. Such devices may be a dedicated gaming station such as an Xbox or PlayStation device.

In an embodiment, the gaming provider may instantiate a software agent that can detect and report spare capacity. The software agent or its function may be part of the gaming server microservices 223 and gaming station microservices modules 224 shown in FIG. 2A and FIG. 2B. The software agent recognizes active gaming devices and detects a level of usage of the gaming devices and any spare capacity that may exist. If a user is actively engaged in a game or multiple games, plus other activities including video downloads, for example, the gaming station may have little or no spare capacity. The gaming provider may recognize the particular model or type of gaming station and have awareness of the hardware and software capabilities of the gaming station. The gaming provider may be able to conclude from this information whether a particular gaming station has capacity to act as an edge node and perform additional game processing.

Further, step 242 may include identifying available gaming provider data centers. In some applications, game players using end devices or gaming stations interact with gaming software located at one or more data centers. The data centers are maintained and operated by a provider of the game, such as Microsoft or Sony. The gaming provider may provide one or multiple data centers accessible over a network. Generally, multiple data centers are maintained and located in different geographical regions. In this manner, the data centers are physically closer to individual gamers, reducing network delay. Also, the multiple data centers can provide redundancy in the event one or more data centers is taken offline for maintenance or another reason. Step 242 may include identifying network locations and geographic locations of the various data centers available to participate in providing the game application to the game participants.

Still further, step 242 may involve identifying all available cloud nodes or edge cloud nodes that are in a potential path of a web network among the end-user computers or gaming stations and the game vendor data centers. A cloud node or edge cloud node is a server bank capable of running microservices and is available in the network provider's network.

At step 244, method 240 includes a process of assessing communication link characteristics between each node in the set of nodes collected at step 242, including the end user devices or gaming stations, the gaming provider data centers and the edge cloud nodes. Assessing the communication link characteristics may include determining any useful data or information about the communication links between each node. For example, step 244 may include evaluating characteristics such as throughput in Mbps and delay in msec. Step 244 may include determining instantaneous values as well as tracking values over time. Step 244 may include any suitable technique for measuring the communication link characteristics of interest, including communicating sample game application packets over the communication links to measure values such as throughput and delay.

At step 246, method 240 includes a step of forming a graph of all interconnected nodes. Any suitable graphing style or format may be used. In embodiments, each node of the graph is identified to indicate available capacity, such as communication capacity, processing capacity or data storage capacity determined at step 242. Further, each link of the graph is identified to indicate available bandwidth and delay as determined at step 244.

Following steps 242, 244 and 246, the system performing method 240 has knowledge of the game, including the microservices involved and processor and communication traffic impact of the microservices. Further, the system performing method 240 has available the graph generated in step 246. The method 240 can calculate the delay for each permutation of microservice locations. That is, the method 240 can vary selection of which server or edge cloud node each microservice runs on. The method 240 can further calculate potential delays for each configuration. Based on these calculations, the method 240 can select an optimum configuration.

Thus, method 240 enters a loop including step 248, step 250 and step 252. At step 248, the method 240 selects a possible permutation of microservice locations and network connections. Each permutation may include a number of links and servers between an end user device and another end user device or a game provider data center, for example. The possibilities may be arranged in a list, for example, by some identifying indicator, and the method 240 proceeds through the list in a sequence.

At step 250, the delay for the selected permutation is calculated. For example, the values associated with delays for each link in the selected permutation may be summed or otherwise combined to estimate a permutation delay for the selected permutation. Any other appropriate calculation or estimation may be performed, including weighting some delay values or throughput values according to particular considerations.

At step 252, the method 240 determines if there are more permutations to consider. If so, control returns to step 248 to select a next permutation for delay calculation. If there are not more permutations to consider, control proceeds to step 254. In some embodiments, all permutations of configurations need not be considered. Some may be ruled out based on a priori knowledge or other information.

At step 254, the method 240 includes selecting an optimum configuration from those evaluated in the loop including step 248, step 250 and step 252. Any suitable criteria may be used to select an optimum configuration at step 254. In one example, the configuration that provides the lowest average delay for all possible interactions by participants at gaming stations may be selected. The interactions may include interactions with other participants in the game or interactions with the game itself as processed in the gaming provider data center. In another example, an optimum configuration is considered to be the configuration that provides all participants with, first, equal delays, and second, minimal delays. Thus, if one participant has a delay of 50 msec and other participants have delays of 200 msec, that configuration will not be evaluated as optimum. If a first configuration provides a first delay for all participants of 100 msec and a second configuration provides a second delay for all participants of 75 msec, the second configuration will be chosen as optimum. All participants have substantially equal delays, and the delay is the minimum of the configurations which provide equal delays. Equality of delays may be judged according to any standard, including by applying a tolerance or range of equivalence. For example, all participant delays may be considered equal if they are within 10 percent of an average or nominal value, or within 25 msec of an average or nominal value.

In another embodiment, the optimum solution is found based on the type of game, end-user activity, and requirements for the particular game and session. The solution is based on minimum fair delay. That is, the method 240 operates to reduce the delay but maintain similar delay or disadvantage for each user or participant.

With the most optimum configuration selected according to method 240, the system may proceed on two different paths or phases, or a combination of both phases. The phase selected may depend on the practicality of each phase with respect to the particular game technology employed. A first possible second phase is illustrated by method 260 of FIG. 2D. A second possible second phase is illustrated in an embodiment by method 270 of FIG. 2E.

FIG. 2D illustrates an embodiment of method 260 for real time optimization of the location of microservices in a network such as system 200 of FIG. 2A and system 220 of FIG. 2B. At step 262, the system identifies as target servers the network devices that are part of the optimum configuration selected at step 254, FIG. 2C. Further at step 262, the method 260 spins up on the target servers the microservices required to implement the game or other application. A particular microservice or combination of microservices may be designated for a particular server or edge cloud node, according to the optimum configuration. Step 262 is performed while the game or other application is underway.

Once the necessary microservices are active on the designated target servers, a notification can be sent to each client or gaming station. The notification operates to advise the gaming stations to switch to the new, optimum configuration at a particular, specified switch time. The notification indicates network connections for gaming stations and edge cloud nodes for the optimum configuration. The switch time represents the time of day when all active network elements will switch from the current configuration to the optimum configuration. The switch time may be specified in any suitable manner that is shared or common to all network elements, such as a specified Greenwich Mean Time (GMT). The particular specified switch time may in a time in the near future, such as 30 second or 2 minutes in the future. The notification may include any suitable information needed to enable the switch to the optimum configuration. For example, the notification may indicate a target edge cloud node with which the gaming station will directly communicate for microservices, including a network address for the target edge cloud node.

At step 266, data is synchronized between respective current servers and respective target servers during a period near the switch time. Data is synchronized to ensure that the target server has the current state of the game or other application. Synchronization may include providing data files to the target server, wherein the target files include historical data and other information. Synchronization may also include providing copies of all real time communications between gaming stations, the gaming provider data centers and the current servers. In some embodiments, the duration of the synchronization of step 266 may be limited since such synchronization of data impacts traffic. Synchronization may be done right before the switch time.

At step 268, following the switch time, the old servers that previously implemented the microservices are brought down. Any suitable operations may be taken to deactivate the servers or edge cloud nodes from further performance of the game or other application. The servers may subsequently be reassigned to other network activities.

Method 260 may be used if the game or other application has the ability to switch in real time. If the game or the application does not have the ability to switch in real time, then the method 270 of FIG. 2E may be used.

FIG. 2E illustrates an embodiment of method 270 for machine learning optimization of the location of microservices in a network such as system 200 of FIG. 2A and system 220 of FIG. 2B. At step 272, information is provided to a machine learning process. The information may include information about the optimum configuration determined at step 254 of FIG. 2C, including identification of servers and communication links forming the optimum configuration. Such information may include network addresses of the servers, for example. The information may further include information about the current game parameters or game state, such as the number of players, the time of day, day of week, game score, type of game, etc. The information may further include information about the network, such as levels of data load, other applications that were running on the network components, queue lengths and other data at the time a delay was measured. The information may include a record of predictions made by the machine learning process in the past as well as a conclusion about the validity or accuracy of the prediction.

The machine learning process may be operated at any suitable location such as the machine learning module 230 of the network controller 226 of FIG. 2B. The machine learning process may be embodied in any suitable form such as a neural network, K Nearest Neighbor (KNN) algorithm or decision tree. Historical data about the network, times when a new optimum configuration was selected by the machine learning process, delay measurements and other information may serve as training data for the machine learning process. Based on the input information, including historical information, the machine learning algorithm finds relationships that are significant to the outcome. The historical information may include a conclusion about how successfully a new optimum configuration determined by the machine learning process improved network performance, including for example producing reduced delays or equalized delays, or both, for gaming stations in the network. Based on the relationships uncovered, the machine learning process can make predictions about future operation and circumstances. Further, based on the predictions, the machine learning process can identify a new optimum configuration and direct the network components to switch to that new optimum configuration at a designated switch time.

At step 274, during the game session, additional configurations are calculated and recorded. A procedure such as step 248, step 250, and step 252 of FIG. 2C may be used to identify additional configurations. Additional configurations of network elements may become suitable for implementing the game due to changes occurring over time. For example, more gamers may enter the game, including gamers at different locations on the network or different geographic locations. In other examples, network characteristics may change over time. Network elements such as edge cloud nodes may become available or unavailable in the network. Network traffic levels may vary and cause certain configurations to be more optimal or less optimal over time.

At step 276, the machine learning process creates a model to assess one or more most optimum configurations for each game startup scenario. The model can predict the most optimum configuration based on each possible startup scenario. For example, each startup or initiation of the game or other interactive application may be defined by certain parameters such as time of day, availability and location of network elements, number of gamers or participants, etc.

At step 278, during subsequent game initiation, the machine learning process identifies the current startup parameters for the game. The machine learning process then matches the startup parameters with previously learned game parameters and selects an optimum configuration for the startup parameters based on the matching.

Step 278, step 280, step 282 and step 284 may be performed in a loop during game play. Once the game is started at step 278, a prediction is made, and the best configuration is implemented. During game play, the machine learning model can continue predicting configurations for the network. The predictions may be based on any input data received by the machine learning model, including current network conditions, players present and active in the game, etc. The predictions can be based on or focused on the near future time frame, such as the next one minute or the next five minutes or the next hour. Any suitable time frame for prediction may be used, and the time frame may be variable based on other factors. During the game at step 280, if the machine learning model identifies a scenario or network configuration with a high confidence factor, the machine learning model can trigger a change or another change.

If no better configuration is identified, control proceeds to step 282 and game play proceeds. If the machine learning model identifies a better configuration of the network, at step 284 a new, better configuration is selected by the configuration manager. The new configuration is selected and communicated to all network elements and the change is made.

The results of the machine learning change can be further assessed. For example, the machine learning module can assess or receive information about whether the new configuration did measurably improve or degrade the parameter for the game or for network communications. The assessment or received information can, in turn, be used to improve and fine tune the configuration of the network. The loop consisting of step 278, step 280, step 282 and step 284 may be performed several times.

At step 280, the machine learning model determines if there is a current better configuration for the network. The better configuration may be better in any suitable manner for network operation.

In accordance with method 270, there is no need to switch configuration in the middle of a game and hence the method 270 can be used in all scenarios. However, if the system allows for a reconfiguration of servers during the game, it can still be used to start with the optimum scenario and also reduce the number of potential reconfigurations during the gaming session.

While for purposes of simplicity of explanation, the respective processes are shown and described as a series of blocks in FIGS. 2C, 2D and 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network 300 is presented that can be used to implement some or all of the subsystems and functions of system 100, the subsystems and functions of system 200, system 220, method 240, method 260 and method 270 presented in FIG. 1, FIG. 2A, FIG. 2B, FIGS. 2C, 2D and 2E, and 3. For example, virtualized communication network 300 can facilitate in whole or in part collecting network delay information from end user gaming devices and available capacity information and selecting an optimum configuration for placement of microservices, the optimum configuration being a network configuration which minimizes network delay for all end user gaming devices.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
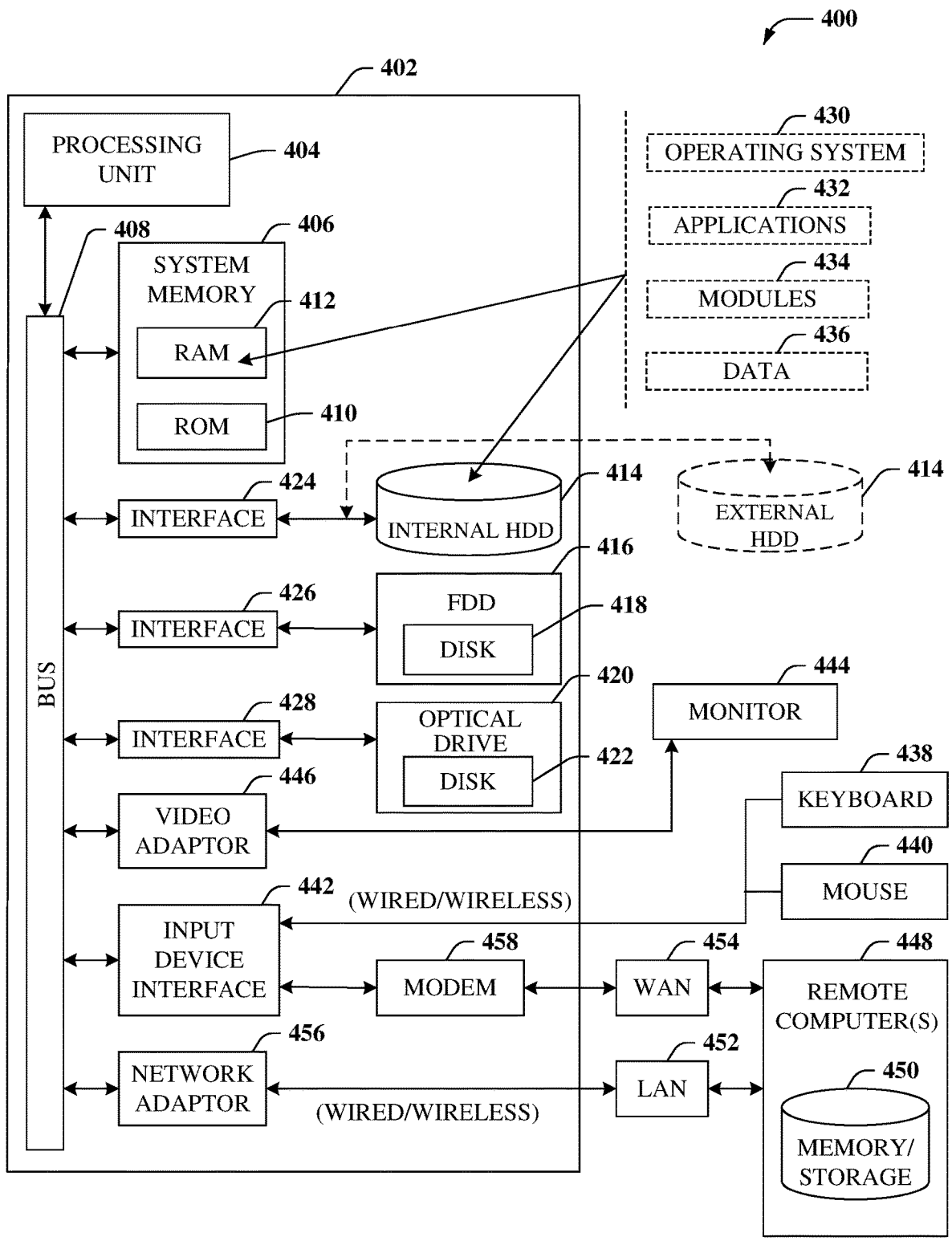
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part collecting network delay information from end user gaming devices and available capacity information and selecting an optimum configuration for placement of microservices, the optimum configuration being a network configuration which minimizes network delay for all end user gaming devices.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
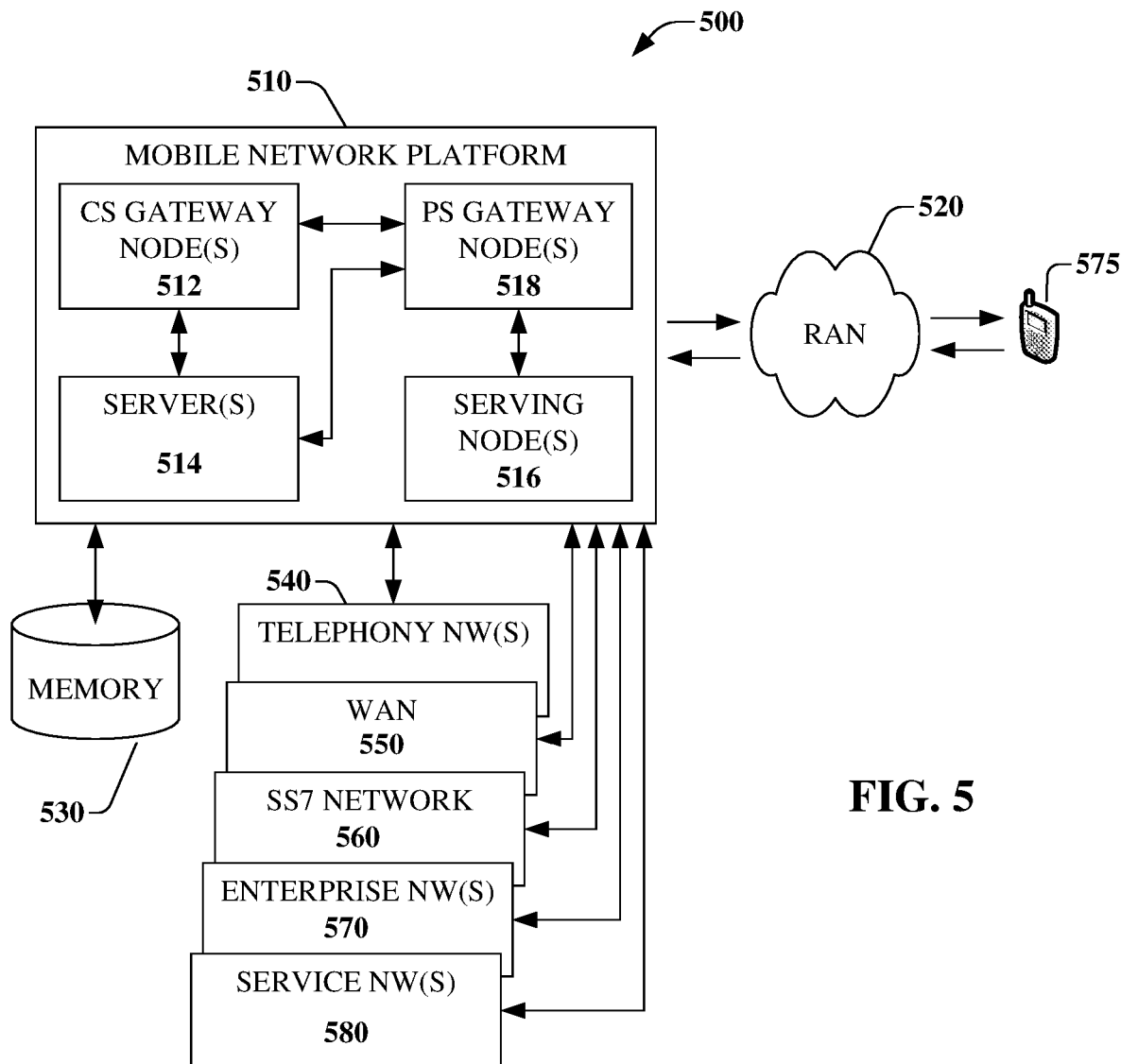
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part collecting network delay information from end user gaming devices and available capacity information and selecting an optimum configuration for placement of microservices, the optimum configuration being a network configuration which minimizes network delay for all end user gaming devices. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through network(s) associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
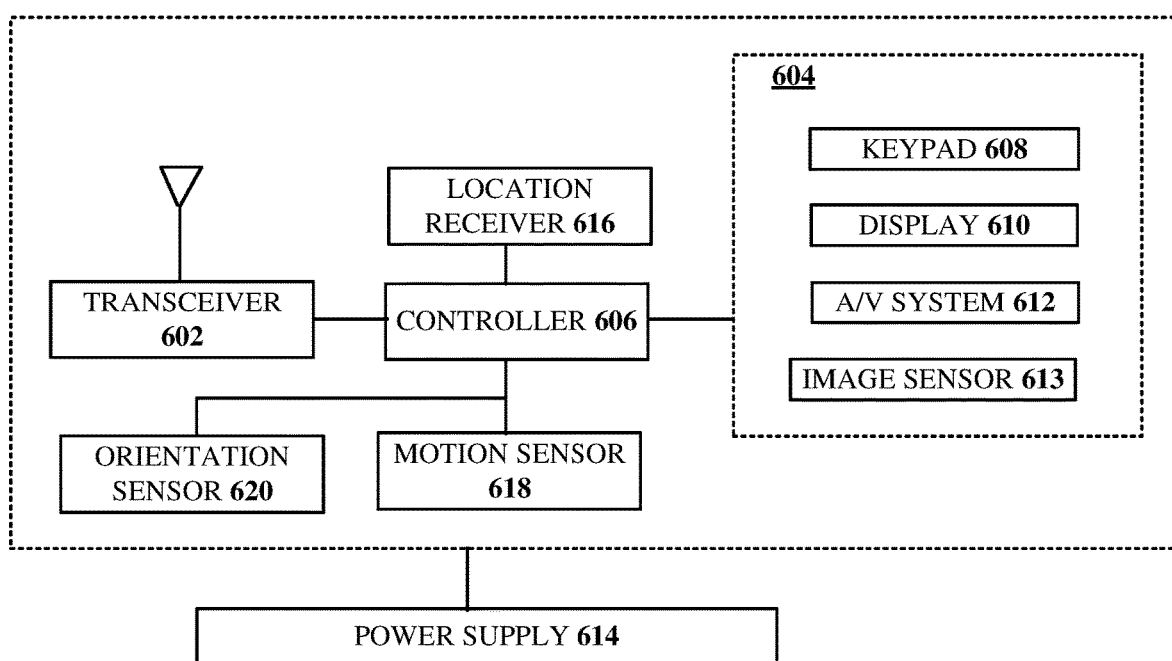
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part collecting network delay information from end user gaming devices and available capacity information and selecting an optimum configuration for placement of microservices, the optimum configuration being a network configuration which minimizes network delay for all end user gaming devices.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

The invention claimed is:
1. A device, comprising:
a processing system including a processor; and
a memory that stores executable instructions that, when executed by the processing system, facilitate performance of operations, the operations comprising:
receiving, from client software agents located at respective end user gaming stations, information about available capacity of the respective end user gaming stations;

receiving, from server software agents located at respective cloud nodes of a communication network, information about availability of the respective cloud nodes;

receiving, from the client software agents, information about communication link characteristics including delay times through the communication network;

forming a graph of network nodes and communication links in the communication network, the graph specifying a respective available capacity for each respective network node and a respective delay for each respective communication link;

for a set of network configurations, determining a potential delay for each possible permutation of network configurations, forming a set of potential delays;

selecting a selected configuration based on the set of potential delays; and reconfiguring the communication network according to the selected configuration.

2. The device of claim 1, wherein the selecting a selected configuration comprises:

selecting, based on the set of potential delays, a network configuration providing equal delays for each respective end user gaming station of the respective end user gaming stations.

3. The device of claim 1, wherein the selecting a selected configuration further comprises:

selecting, based on the set of potential delays, an optimum network configuration providing minimum delays and equal delays for each respective end user gaming station of the respective end user gaming stations.

4. The device of claim 1, wherein the reconfiguring the communication network comprises:

identifying a switch time; and communicating to the respective end user gaming stations and the respective cloud nodes a message indicating the switch time, the message further indicating network connections for the selected configuration.

5. The device of claim 4, wherein the operations further comprise:

identifying target servers of the selected configuration; and synchronizing, for a time period prior to the reconfiguring the communication network, operation of the respective cloud nodes and the target servers.

6. The device of claim 1, wherein the receiving information about communication link characteristics comprise:

receiving delay data representing a delay time through the communication network from the respective end user gaming stations to one or more gaming data centers operated by a gaming vendor, wherein the respective end user gaming stations interact with the one or more gaming data centers to implement a video game for users at the respective end user gaming stations.

7. The device of claim 1, wherein the determining a potential delay for each possible permutation of network configurations comprises:

selecting a possible network configuration, wherein the possible network configuration includes a set of end user gaming stations, a set of cloud nodes of the communication network and a set of gaming data centers, and available communication links of the communication network;

calculating a set of delays through the communication network for the possible network configuration, the set of delays including communication delays from each end user gaming station of the set of end user gaming stations and each gaming data center of the set of gaming data centers; and repeating the selecting a possible network configuration and the calculating a set of delays for each possible permutation of network configurations, forming the set of potential delays.

8. The device of claim 1, wherein the operations further comprise:

creating a machine learning model based on the set of network configurations;

providing to the machine learning model current game parameters;

receiving, from the machine learning model, a new optimum configuration; and reconfiguring the communication network according to the new optimum configuration.

9. The device of claim 8, wherein the operations further comprise:

providing to the machine learning model information about a startup scenario for a video game;

receiving, from the machine learning model, an optimum startup configuration for the communication network, the optimum startup configuration corresponding to the startup scenario; and configuring the communication network according to the optimum startup configuration.

10. A non-transitory machine-readable medium, comprising executable instructions that, when executed by a processing system including a processor, facilitate performance of operations, the operations comprising:

determining delay data for respective network delays through a communication network from respective gaming stations to a gaming provider database for implementing a multi-user online video game;

determining available cloud nodes in the communication network, the available cloud nodes located in a potential path between a respective gaming station and the gaming provider database, the available cloud nodes capable of running microservices for the multi-user online video game;

determining potential network configurations for data communication between the respective gaming stations and the gaming provider database using the available cloud nodes and available communication links;

based on the delay data for respective network delays, identifying a selected configuration for data communication between the respective gaming stations and the gaming provider database, wherein the selected configuration is selected as a network configuration that provides a minimum fair delay for the respective gaming stations; and configuring the communication network according to the selected configuration.

11. The non-transitory machine-readable medium of claim 10, wherein the operations further comprise:

training a machine learning model on historical information about one or more optimum configurations and conclusions about improvements in network performance due to configuring the communication network according to the one or more optimum configurations; and predicting a switch time to reconfigure the communication network according to a new optimum configuration.

12. The non-transitory machine-readable medium of claim 11, wherein the operations further comprise:

providing to the machine learning model information about a startup scenario for the multi-user online video game;

receiving, from the machine learning model, an optimum startup configuration for the communication network, the optimum startup configuration corresponding to the startup scenario; and configuring the communication network according to the optimum startup configuration.

13. The non-transitory machine-readable medium of claim 10, wherein the configuring the communication network according to the selected configuration comprises:

identifying a switch time; and communicating to the respective gaming stations and the available cloud nodes a message indicating the switch time, the message further indicating network connections among the respective gaming stations and the available cloud nodes for the respective selected configuration.

14. The non-transitory machine-readable medium of claim 13, wherein the operations further comprise:

identifying target servers of the selected configuration; and synchronizing, for a time period prior to the configuring the communication network, operation of the available cloud nodes and the target servers to share game state information for the multi-user online video game with the available cloud nodes.

15. The non-transitory machine-readable medium of claim 10, wherein the configuring the communication network according to the selected configuration comprise:

instantiating gaming station microservices of the multi-user online video game at selected gaming stations, the selected gaming stations being identified according to the selected configuration; and instantiating gaming server microservices of the multi-user online video game at selected available cloud nodes of the communication network, the selected available cloud nodes being identified according to the selected configuration.

16. The non-transitory machine-readable medium of claim 10, wherein the operations further comprise:

forming a graph of gaming stations, available cloud nodes and communication links in the communication network, the graph specifying a respective client available capacity for each gaming station, a respective available server capacity for each available cloud node and a respective delay for each respective communication link;

estimating a delay from each gaming station to the gaming provider database based on the graph, forming a set of potential delays; and selecting the selected configuration based on the set of potential delays.

17. A method, comprising:

receiving, by a processing system including a processor, measured delay information, the measured delay information corresponding to delay times measured by user device software agents instantiated at user gaming devices of a communication network, the delay times representing data communication delays from the user gaming devices to a network gaming data center which is operative to provide an interactive gaming application to the user gaming devices;

receiving, by the processing system, available capacity information, the available capacity information corresponding to available processing capacity determined by server software agents instantiated at edge cloud nodes of the communication network;

selecting, by the processing system, an optimum configuration for providing the interactive gaming application to the user gaming devices by the network gaming data center, wherein the selecting is based on the measured delay information and the available capacity information and wherein the optimum configuration is selected as a network configuration of the communication network that provides equal delays and minimum delays for each respective user gaming device of the user gaming devices participating in the interactive gaming application; and configuring, by the processing system, the communication network according to the optimum configuration.

18. The method of claim 17, wherein the configuring the communication network comprises:

instantiating, by the processing system, user gaming device microservices of the interactive gaming application at user gaming devices identified by the optimum configuration; and instantiating, by the processing system, gaming server microservices of the interactive gaming application at target edge cloud nodes identified by the optimum configuration.

19. The method of claim 18, comprising:

receiving, by the processing system, the measured delay information and the available capacity information during current operation of the interactive gaming application.

20. The method of claim 19, further comprising:

synchronizing, by the processing system, a respective target edge cloud node with a respective current edge cloud node, the respective current edge cloud node engaged in the current operation of the interactive gaming application, wherein the synchronizing comprises sharing game state information for the interactive gaming application from the respective current edge cloud node to the respective target edge cloud node.

* * * * *